(12) United States Patent
Chen et al.

(10) Patent No.: US 9,288,876 B2
(45) Date of Patent: Mar. 15, 2016

(54) METHOD AND DEVICE FOR AUTOMATICALLY CONTROLLING STATE INDICATOR OF TERMINAL DEVICE

(71) Applicant: ZTE Corporation, Shenzhen (CN)

(72) Inventors: Juncheng Chen, Shenzhen (CN); Jian Chen, Shenzhen (CN); Lina Yang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/768,802

(22) PCT Filed: Sep. 18, 2013

(86) PCT No.: PCT/CN2013/083800
§ 371 (c)(1),
(2) Date: Aug. 19, 2015

(87) PCT Pub. No.: WO2014/127631
PCT Pub. Date: Aug. 28, 2014

(65) Prior Publication Data
US 2016/0014870 A1 Jan. 14, 2016

(30) Foreign Application Priority Data
Feb. 19, 2013 (CN) .......................... 2013 1 0053546

(51) Int. Cl.
*H05B 37/02* (2006.01)
(52) U.S. Cl.
CPC .................................. *H05B 37/0218* (2013.01)
(58) Field of Classification Search
CPC ... G09G 5/00; G09G 5/10; G09G 2320/0626; G09G 2320/064; G09G 2360/14; G09G 2360/144; Y02B 20/40; Y02B 20/42; Y02B 20/46; Y02B 20/48; H05B 33/0815
USPC ............ 315/149, 291, 297, 307, 360; 345/30, 345/204
See application file for complete search history.

(56) References Cited

U.S. PATENT DOCUMENTS

| | | | | |
|---|---|---|---|---|
| 6,545,703 B1 * | 4/2003 | Takahashi | .......... | H04N 5/23209 348/625 |
| 7,791,773 B2 * | 9/2010 | Akahane | .............. | H04N 1/0049 358/474 |
| 7,907,114 B2 * | 3/2011 | Kurosaki | .............. | G06F 1/1601 345/102 |

FOREIGN PATENT DOCUMENTS

| | | |
|---|---|---|
| CN | 101640726 A | 2/2010 |
| CN | 102469656 A | 5/2012 |
| CN | 102679501 A | 9/2012 |
| CN | 103200733 A | 7/2013 |
| JP | H0917576 A | 1/1997 |

OTHER PUBLICATIONS

International Search Report for corresponding application PCT/CN2013/083800 filed Sep. 18, 2013; Filed Nov. 28, 2013.

* cited by examiner

*Primary Examiner* — Haissa Philogene
(74) *Attorney, Agent, or Firm* — Cantor Colburn LLP

(57) ABSTRACT

Provided are a method and device for automatically controlling a state indicator of a terminal device. The method comprises: brightness of a working environment of a terminal device is detected in real time to acquire a brightness signal of the working environment of the terminal device; a current electric level value of the brightness signal is determined according to a variation of the electric level value of the brightness signal within a preset duration; the current electric level value is determined as a light-on electric level value or a light-off electric level value by using a preset threshold; and the state indicator of the terminal device is controlled to carry out a light-on or light-off operation according to the determined light-on electric level value or light-off electric level value.

10 Claims, 3 Drawing Sheets

METHOD AND DEVICE FOR AUTOMATICALLY CONTROLLING STATE INDICATOR OF TERMINAL DEVICE

TECHNICAL FIELD

The disclosure relates to the technical field of terminal communication, and in particular to a method and device for automatically controlling a state indicator of a terminal device.

BACKGROUND

With the development of network access technology, the application of home terminal devices is becoming increasingly popular, the functional requirements are becoming more and more extensive, and the state indicators for controlling each function are becoming more and more, such as USB indicator, WAN indicator, DSL indicator, LAN indicator, VoIP indicator, WLAN indicator, power indicator, and so on. The more indicators controlling various functional modules, the more electric energy consumed per unit of time; at the same time, as long as the function modules of this indicator are running, the indicator would be in operation; for example, if a user rests at night but the user keeps a terminal device on to download data, the long time flash of the state indicator would inevitably affect the bedroom environment and disturb the user's rest.

Currently, the related technologies involving control of an indicator of a terminal device are mainly to provide a method for manually controlling a state indicator by means of a switch, and the switch is implemented by hardware circuit switch control or software logic switch control, which has a lot to do with the user's operating habits and has not reached the true intelligent effects. This method just gives the user a way to improve the subjective feeling, and at the same time it is also limited to the home gateway only.

SUMMARY

The embodiments of the disclosure provide a method and device for automatically controlling a state indicator of a terminal device, so as to control the indicator to carry out a corresponding light-on or light-off operation according to the brightness of an environment, to avoid the disturbance of the state indicator of the terminal device to the user.

According to a first aspect of the embodiments of the disclosure, the method for automatically controlling a state indicator of a terminal device provided by the embodiments of the disclosure comprises the steps of: detecting brightness of a working environment of a terminal device in real time to acquire a brightness signal of the working environment of the terminal device; determining a current electric level value of the brightness signal according to a variation of the electric level value of the brightness signal within a preset duration; determining the current electric level value as a light-on electric level value or a light-off electric level value according to a preset threshold; and controlling the state indicator of the terminal device to carry out a light-on or light-off operation according to the determined light-on electric level value or light-off electric level value.

Preferably, detecting the brightness of the working environment of the terminal device in real time to acquire the brightness signal of the working environment of the terminal device comprises: using a light sensitive characteristic of a photosensitive device set inside or around the terminal device to acquire the environment brightness signal of which the electric level value varies with the intensity of light.

Preferably, determining the current electric level value of the environment brightness signal according to the variation of the electric level value of the environment brightness signal within a preset duration comprises: calculating the variation according to a plurality of electric level values of the environment brightness signal acquired by the photosensitive device within the preset duration; and if the calculated variation is smaller than a preset variation, determining any one of the acquired electric level values as the current electric level value.

Preferably, determining the current electric level value as the light-on electric level value or the light-off electric level value according to the preset threshold comprises:
comparing the current electric level value with the preset threshold; if the current electric level value is greater than the preset threshold, determining the current electric level value as the light-on electric level value; and if the current electric level value equals to or is smaller than the preset threshold, determining the current electric level value as the light-off electric level value.

Preferably, the photosensitive device is a photosensitive resistor or photosensitive diode, and the photosensitive device transmits the electric level value of the environment brightness signal acquired using the light sensitive characteristic thereof to a PCI bus of the terminal device.

Preferably, calculating the variation according to the plurality of electric level values of the environment brightness signal acquired by the photosensitive device within the preset duration comprises: successively reading the plurality of electric level values on the PCI bus within a preconfigured time length of a timer; taking one of the read electric level values as a reference electric level value; and acquiring difference values or variation ratios between other electric level values that are read and the reference electric level value, and taking the largest difference value or variation ratio therein as the variation.

Preferably, controlling the state indicator of the terminal device to carry out the light-on or light-off operation according to the determined light-on electric level value or light-off electric level value comprises: acquiring an operating state of the state indicator of the terminal device; in the case that the acquired operating state of the state indicator of the terminal device is a light-on state, if the current electric level value is determined as the light-on electric level value, keeping the light-on state of the state indicator of the terminal device; otherwise, switching the operating state of the state indicator of the terminal device into a light-off state; and in the case that the acquired operating state of the state indicator of the terminal device is the light-off state, if the current electric level value is determined as the light-on electric level value, switching the operating state of the state indicator of the terminal device into the light-on state; otherwise, keeping the light-off state of the state indicator of the terminal device.

According to a second aspect of the embodiments of the disclosure, a device for automatically controlling a state indicator of a terminal device provided by the embodiments of the disclosure comprises: a brightness signal acquisition component configured to detect brightness of a working environment of a terminal device in real time to acquire a brightness signal of the working environment of the terminal device; a brightness signal current electric level value determination component configured to determine a current electric level value of the brightness signal according to a variation of the electric level value of the brightness signal within a preset duration; a light-on and light-off electric level value determination component configured to determine the current electric level value as a light-on electric level value or a light-off electric level value by using a preset threshold; and an indicator control component configured to control the state indicator of the terminal device to carry out a light-on or light-off operation according to the determined light-on electric level value or light-off electric level value.

Preferably, the brightness signal acquisition component is a photosensitive device set inside or around the terminal device and is configured to use a light sensitive characteristic thereof to acquire the environment brightness signal of which the electric level value varies with the intensity of light.

Preferably, the brightness signal current electric level value determination component comprises: a calculation element configured to calculate the variation according to a plurality of electric level values of the environment brightness signal acquired by the photosensitive device within the preset duration; and a determination element configured to determine any one of the acquired electric level values as the current electric level value if the calculated variation is smaller than a preset variation.

With respect to the prior art, the beneficial technical effect of the embodiments of the disclosure is: using the working environment brightness of the terminal device to automatically control the light-on or light-off operation of the state indicator of the terminal device avoids the disturbance of the state indicator to the user.

DETAILED DESCRIPTION OF THE EMBODIMENTS

Below is the description of a method and device for automatically avoiding disturbance of a state indicator of a terminal device provided by the embodiments of the disclosure with reference to the accompanying drawings.

Figure 1:
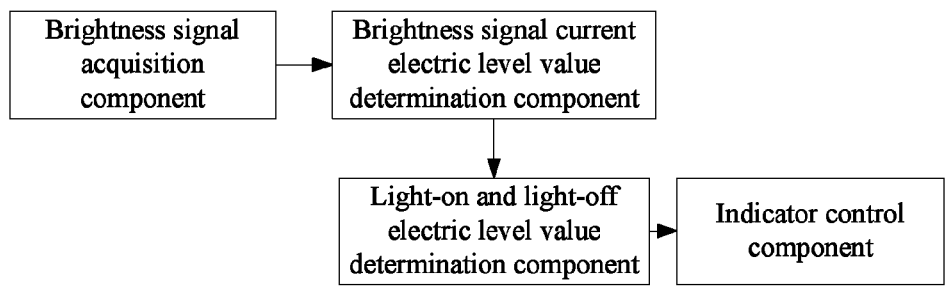
FIG. 1 is a schematic diagram of a device for automatically controlling a state indicator of a terminal device according to a first embodiment of the disclosure.

FIG. 1 is a schematic diagram of a device for automatically controlling a state indicator of a terminal device according to an embodiment of the disclosure. As shown in FIG. 1, the device in the embodiment comprises:

a brightness signal acquisition component configured to detect brightness of a working environment around a terminal device in real time to acquire a brightness signal of the working environment of the terminal device;

a brightness signal current electric level value determination component configured to determine a current electric level value of the brightness signal according to a variation between (a plurality of) electric level values of the brightness signal within a preset duration (i.e. a variation between each of the plurality of electric level values and a reference electric level value within the duration; the variation may be either a difference value between the brightness signal electric level value and the reference electric level value or a variation ratio of the brightness signal electric level value to the reference electric level value);

a light-on and light-off electric level value determination component configured to determine the current electric level value as a light-on electric level value (e.g. high electric level) or a light-off electric level value (e.g. low electric level) according to a preset threshold; and an indicator control component configured to control the state indicator of the terminal device to carry out a light-on or light-off operation according to the determined light-on electric level value or light-off electric level value.

The above-mentioned brightness signal acquisition component is a photosensitive device set inside or around the terminal device, for example, a photosensitive resistor or photosensitive diode which uses a light sensitive characteristic thereof to acquire the brightness signal of which the electric level value varies with the intensity of light.

The light sensitive characteristic of a photosensitive resistor or photosensitive diode usually means that: in a dark environment, the resistance value thereof is very high, and when illuminated by the light, as long as the photon energy is greater than the width of a valence band of semiconductor material, electrons in the valence band may transition to the conduction band after absorbing the energy of a photon and produce a hole of positive charge in the valence band, and this type of electron-hole pair produced by illumination increases the number of carriers in the semiconductor material and diminishes the resistivity thereof, thereby causing the resistance value thereof to decline. The stronger the illumination, the lower the resistance value. After the incident light disappears, the electron-hole pair produced by the excitation of the photon will gradually recombine and the resistance value thereof also gradually restores to the original value.

As the photosensitive resistor or photosensitive diode changes the electric current thereof by inducing the intensity of external light, the embodiments of the disclosure may acquire a brightness signal of the working environment.

The above-mentioned brightness signal current electric level value determination component comprises: a calculation element (not shown in the figure) configured to calculate a variation between a plurality of electric level values of the environment brightness signal acquired by the photosensitive device within the preset duration; and a current electric level value determination element (not shown in the figure) configured to take any one of the acquired electric level values as the current electric level value based on that the calculated variation is smaller than a preset variation.

The above-mentioned light-on and light-off electric level value determination component comprises: a comparison element (not shown in the figure) configured to compare the current electric level value with the preset threshold; a light-on and light-off electric level value determination element (not shown in the figure) configured to take the current electric level value as the light-on electric level value when the current electric level value is greater than the preset threshold, and take the current electric level value as the light-off electric level value if the current electric level value equals to or is smaller than the preset threshold.

Figure 2:
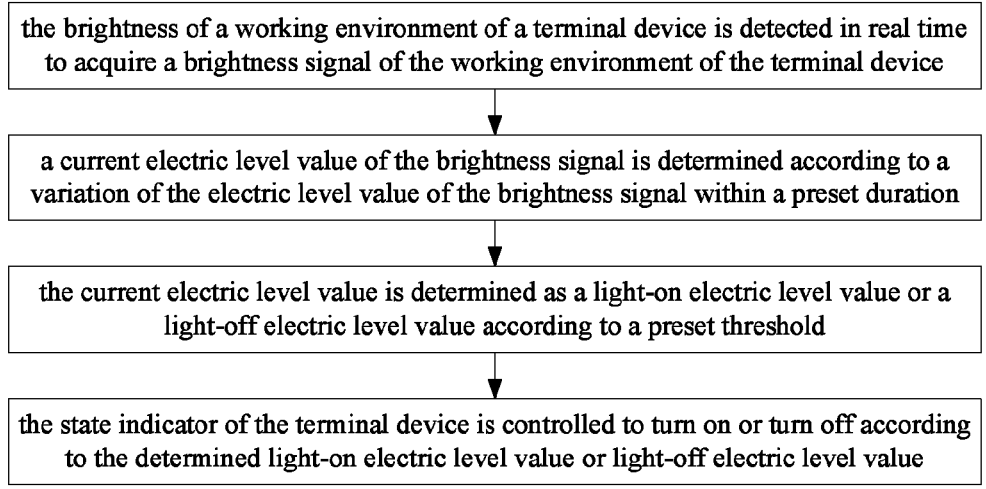
FIG. 2 is a schematic diagram of a method for automatically controlling a state indicator of a terminal device according to an embodiment of the disclosure.

FIG. 2 is a schematic diagram of a method for automatically controlling a state indicator of a terminal device according to an embodiment of the disclosure. As shown in FIG. 2, the method comprises the following steps of:

step A, detecting the brightness of a working environment of a terminal device in real time to acquire a brightness signal of the working environment of the terminal device;

step B, determining a current electric level value of the brightness signal according to a variation of the electric level value of the brightness signal within a preset duration;

step C, taking the current electric level value as a light-on electric level value or a light-off electric level value according to a preset threshold; and step D, controlling the state indicator of the terminal device to carry out a light-on or light-off operation according to the determined light-on electric level value or light-off electric level value.

The above-mentioned step A comprises: using a light sensitive characteristic of a photosensitive device set inside or around the terminal device to acquire the environment brightness signal of which the electric level value thereof varies with the intensity of light.

The above-mentioned step B comprises: step B1, calculating a variation of a plurality of electric level values of the environment brightness signal acquired by the photosensitive device within the preset duration; and step B2, if the calculated variation is smaller than a preset variation, determining any one of the acquired electric level values as the current electric level value.

The above-mentioned step C comprises: step C1, comparing the current electric level value with the preset threshold; step C2, if the current electric level value is greater than the preset threshold, determining the current electric level value as the light-on electric level value; and step C3, if the current electric level value equals to or is smaller than the preset threshold, determining the current electric level value as the light-off electric level value.

In a specific instance, the above-mentioned photosensitive device is a photosensitive resistor or photosensitive diode, and the photosensitive device transmits the electric level value of the environment brightness signal acquired according to the light sensitive characteristic thereof to a Peripheral Component Interconnect (abbreviated as PCI) bus of the terminal device.

The above-mentioned step B1 comprises: successively reading the plurality of electric level values on the PCI bus within a preconfigured timer length; taking one of the read electric level values as a reference electric level value; and acquiring difference values or variation ratios between other electric level values that are read and the reference electric level value, and taking the largest difference value or variation ratio therein as the variation.

The above-mentioned step D comprises: step D1, acquiring an operating state of the state indicator of the terminal device; step D2, in the case that the acquired operating state of the state indicator of the terminal device is a light-on state, if the current electric level value is determined as the light-on electric level value, keeping the light-on state of the state indicator of the terminal device; otherwise, switching the operating state of the state indicator of the terminal device into a light-off state; and step D3, in the case that the acquired operating state of the state indicator of the terminal device is the light-off state, if the current electric level value is determined as the light-on electric level value, switching the operating state of the state indicator of the terminal device into the light-on state; otherwise, keeping the light-off state of the state indicator of the terminal device.

Figure 3:
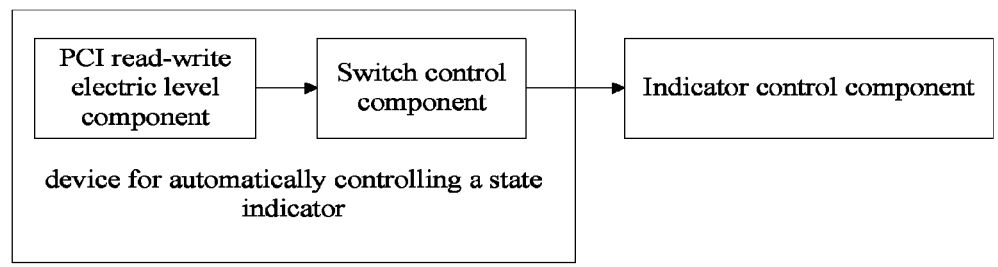
FIG. 3 is a schematic diagram of a device for automatically controlling a state indicator of a terminal device according to a second embodiment of the disclosure.

FIG. 3 is a schematic diagram of a device for automatically controlling a state indicator of a terminal device according to a second embodiment of the disclosure. As shown in FIG. 3, the device comprises a PCI read-write electric level component and a switch control component.

The PCI read-write electric level component regularly reads the variation of the pin electric level of the photosensitive resistor or photosensitive diode by means of a PCI bus to judge the working environment of the user and to determine whether to turn on or turn off the state indicator, i.e. determining the current electric level value of the brightness signal according to the electric level variation, and judging the working environment of the user by comparing same with the preset threshold. For example, the current electric level value which is greater than the preset threshold is determined as the light-on electric level value and, at the same time, the working environment of the user is judged as an environment where the indicator may be turned on; alternatively, the current electric level value which equals to or is smaller than the preset threshold is determined as the light-off electric level value and, at the same time, the working environment of the user is judged as an environment where the indicator is turned off.

By reading the current operating state of all state indicators, the switch control component controls the indicator function component as shown in FIG. 3 to perform a corresponding control on the indicator according to the light-on electric level value or light-off electric level value outputted by the PCI read-write electric level component.

Figure 4:
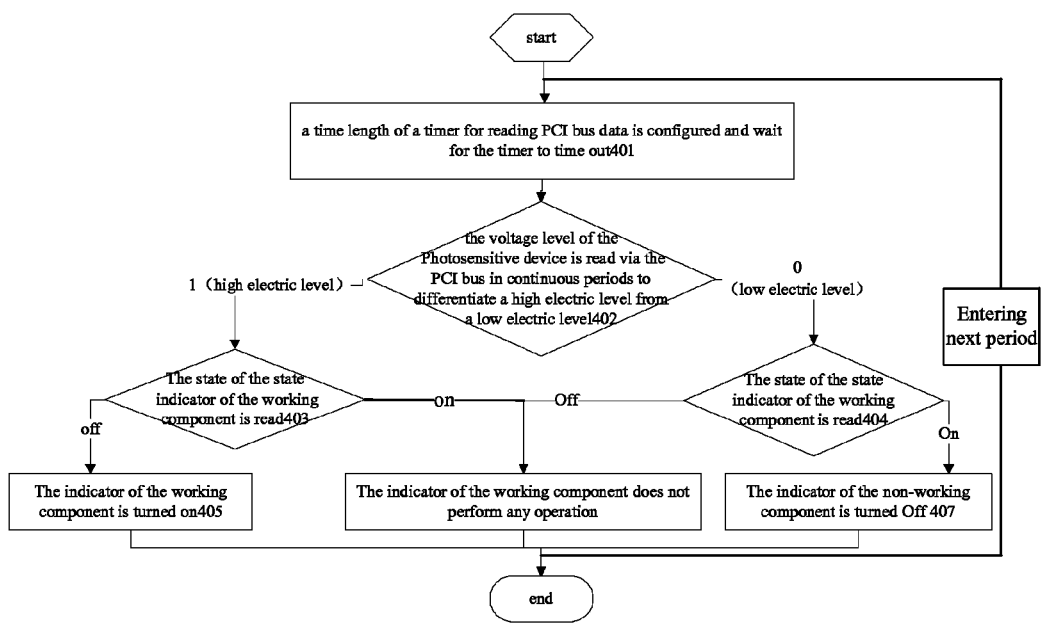
FIG. 4 is a flowchart for automatically controlling a state indicator of a terminal device by using a PCI bus according to an embodiment of the disclosure.

FIG. 4 is a flowchart for automatically controlling a state indicator of a terminal device by using a PCI bus according to an embodiment of the disclosure. As shown in FIG. 4, the flow comprises:

flow 401, the terminal device configures a timer for reading the electric level of a photosensitive resistor or photosensitive diode on the PCI bus, wherein the time length of the timer is generally 5 seconds or so by default, and a process scans the timer every 10 milliseconds to determine whether the timer expires. If the timer expires, flow 401 is performed.

Flow 402, the process reads the voltage level value of the photosensitive resistor or photosensitive diode on the PCI bus, and continually checks the variation of the electric level value in several periods, and if the range of variation is within 0.2 (0.2 times the rated electric level value), it means that the electric level value tends towards stability and it may be deemed that the electric level value within the time length of the timer remains the read value; if the range of variation is greater than 0.5 (0.5 times the rated electric level value), the electric level is recorded as a high electric level; otherwise, the electric level is recorded as a low electric level; the continued periods may be set here to, for example, 100 milliseconds.

Flow 403, if the voltage level value is a high electric level, it indicates that the working environment of the user has light and the user is probably using the terminal device for work; and the state of the state indicator of the working component is read.

Flow 404, if the voltage level value is a low electric level, it indicates that the working environment of the user has no light and is dark, and the user is probably at rest or is not using the device; and then the state of the state indicator of the working component is read.

Flow 405, if the state of the state indicator of the related working component is off, it is needed to enable the state indicator function component to turn the state indicator on, end this flow and go into the next timer.

Flow 406, as flow 403 judges, if the state of the state indicator of the related working component is on; as flow 404 judges, if the state of the indicator of the related working component is off, then the system does not perform any operation on the state indicator of the current working component, ends this flow and goes into the next period.

Flow 407, if the state of the state indicator of the related working component is on, the state indicator function component is enabled to turn the state indicator off, end the flow and go into the next period.

The working principle of the flow may be summarized as: a photosensitive resistor or photosensitive diode induces the intensity of external light to change its electric current, and the real electric level variation may be read via a PCI bus, which ranges from 0 to 1 (i.e. the rated electric level value). If the range of variation of the electric level value is within 0.2 (i.e. 0.2 times the rated electric level value) within the duration (e.g. 200 milliseconds), it may be deemed that the electric level value remains unchanged within the period (a time interval for reading the variation of the electric level on the PCI bus), and if the value thereof is greater than 0.5 (i.e. 0.5 times the rated electric level value), the electric level value is regarded as a high electric level; otherwise, the electric level value is regarded as a low electric level; and then whether to turn on or off the state indicator may be determined according to the operating state of the component corresponding to the state indicator. The structure of the device for controlling the state indicator comprises: a PCI read-write component, a switch control component, and an indicator function component. The system regularly reads the variation of the electric level of the photosensitive resistor or photosensitive diode by means of the PCI read-write electric level component, learns about the external state of the photosensitive resistor or photosensitive diode, and informs the switch control component to determine whether to enable the indicator function component to realize the light-on or light-off function.

It is to be noted that the terminal device mentioned in the embodiments of the disclosure comprises Passive Optical Network (PON) terminals, home gateways, electric power modems, set top boxes, and other home used devices.

To sum up, the embodiments of the disclosure automatically control the light-on or light-off operation of a state indicator of a terminal device by using the brightness of a working environment of the terminal device, thereby avoiding the disturbance of the state indicator to the user.

Although above is a detailed description of the disclosure, the disclosure is not limited thereto, and a person skilled in the art can make all kinds of modifications according to the principle of the disclosure. Therefore, it should be understood that any modification made according to the principle of the disclosure falls into the scope of protection of the disclosure.

INDUSTRIAL APPLICABILITY

The technical solution of the embodiments of the disclosure can be applicable to the field of terminal devices and solves the disturbance of a state indicator to a user.

What is claimed is:

1. A method for automatically controlling a state indicator of a terminal device, comprising:
   detecting brightness of a working environment of a terminal device in real time to acquire a brightness signal of the working environment of the terminal device;
   determining a current electric level value of the brightness signal according to a variation of electric level values of the brightness signal within a preset duration;
   determining the current electric level value as a light-on electric level value or a light-off electric level value according to a preset threshold; and
   controlling the state indicator of the terminal device to carry out a light-on or light-off operation according to the determined light-on electric level value or light-off electric level value.

2. The method according to claim 1, wherein detecting the brightness of the working environment of the terminal device in real time to acquire the brightness signal of the working environment of the terminal device comprises:
   using a light sensitive characteristic of a photosensitive device, which is set inside or around the terminal device, to acquire the brightness signal of which the electric level value varies with the intensity of light.

3. The method according to claim 2, wherein determining the current electric level value of the brightness signal according to the variation of the electric level value of the environment brightness signal within the preset duration comprises:
   calculating the variation according to a plurality of electric level values of the brightness signal acquired by the photosensitive device within the preset duration; and
   based on that the calculated variation is smaller than a preset variation, determining any one of the acquired electric level values as the current electric level value.

4. The method according to claim 3, wherein determining the current electric level value as the light-on electric level value or the light-off electric level value according to the preset threshold comprises:
   comparing the current electric level value with the preset threshold;
   based on that the current electric level value is greater than the preset threshold, determining the current electric level value as the light-on electric level value; and
   based on that the current electric level value equals to or is smaller than the preset threshold, determining the current electric level value as the light-off electric level value.

5. The method according to claim 3, wherein the photosensitive device is a photosensitive resistor or photosensitive diode, and the photosensitive device transmits, using the light sensitive characteristic, the electric level value of the environment brightness signal acquired to a PCI bus of the terminal device.

6. The method according to claim 5, wherein calculating the variation according to the plurality of electric level values of the brightness signal acquired by the photosensitive device within the preset duration comprises:
   successively reading the plurality of electric level values on the PCI bus within a preconfigured time length of a timer;
   taking one of the read electric level values as a reference electric level value; and
   acquiring difference values or variation ratios between other electric level values that are read and the reference electric level value and taking the largest difference value or variation ratio as the variation.

7. The method according to claim 4, wherein controlling the state indicator of the terminal device to carry out the light-on or light-off operation according to the determined light-on electric level value or light-off electric level value comprises:
   acquiring an operating state of the state indicator of the terminal device;
   in the case that the acquired operating state of the state indicator of the terminal device is a light-on state, based on that the current electric level value is determined as the light-on electric level value, keeping the light-on state of the state indicator of the terminal device; based on that the current electric level value is determined as the light-off electric level value, switching the operating state of the state indicator of the terminal device into a light-off state; and in the case that the acquired operating state of the state indicator of the terminal device is the light-off state, based on that the current electric level value is determined as the light-on electric level value, switching the operating state of the state indicator of the terminal device into the light-on state; based on that the current electric level value is determined as the light-off electric level value, keeping the light-off state of the state indicator of the terminal device.

8. A device for automatically controlling a state indicator of a terminal device, comprising:
   a brightness signal acquisition component configured to detect brightness of a working environment of a terminal device in real time to acquire a brightness signal of the working environment of the terminal device;
   a brightness signal current electric level value determination component configured to determine a current electric level value of the brightness signal according to a variation of electric level values of the brightness signal within a preset duration;
   a light-on and light-off electric level value determination component configured to determine the current electric level value as a light-on electric level value or a light-off electric level value according to a preset threshold; and
   an indicator control component configured to control the state indicator of the terminal device to carry out a light-on or light-off operation according to the determined light-on electric level value or light-off electric level value.

9. The device according to claim 8, wherein the brightness signal acquisition component is a photosensitive device set inside or around the terminal device and is configured to use a light sensitive characteristic of the photosensitive device to acquire the brightness signal of which the electric level value varies with the intensity of light.

10. The device according to claim 9, wherein the brightness signal current electric level value determination component comprises:
   a calculation element configured to calculate the variation according to a plurality of electric level values of the environment brightness signal acquired by the photosensitive device within the preset duration; and
   a determination element configured to determine any one of the acquired electric level values as the current electric level value based on that the calculated variation is smaller than a preset variation.

* * * * *